United States Patent
Tsuzuki et al.

(10) Patent No.: US 10,115,535 B2
(45) Date of Patent: Oct. 30, 2018

(54) ELECTRIC STORAGE DEVICE

(71) Applicant: TAIYO YUDEN CO., LTD., Taito-ku, Tokyo (JP)

(72) Inventors: Takeo Tsuzuki, Takasaki (JP); Koji Kano, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/059,169

(22) Filed: Mar. 2, 2016

(65) Prior Publication Data
US 2016/0268063 A1    Sep. 15, 2016

(30) Foreign Application Priority Data

Mar. 9, 2015   (JP) .................................. 2015-045403

(51) Int. Cl.
*H01G 11/58* (2013.01)
*H01G 11/60* (2013.01)
*H01G 11/64* (2013.01)

(52) U.S. Cl.
CPC ............. *H01G 11/60* (2013.01); *H01G 11/58* (2013.01); *H01G 11/64* (2013.01); *Y02E 60/13* (2013.01)

(58) Field of Classification Search
CPC ........ H01G 11/54; H01G 11/42; H01G 11/66; H01G 11/34; H01G 11/58; H01G 11/60
See application file for complete search history.

(56) References Cited

U.S. PATENT DOCUMENTS

| 2006/0035143 | A1* | 2/2006 | Kida | H01M 2/0426 |
| | | | | 429/185 |
| 2008/0292971 | A1* | 11/2008 | Ihara | H01M 10/052 |
| | | | | 429/331 |
| 2009/0081534 | A1* | 3/2009 | Takami | H01M 2/1626 |
| | | | | 429/149 |
| 2010/0092846 | A1* | 4/2010 | Inagaki | H01M 4/131 |
| | | | | 429/92 |

(Continued)

FOREIGN PATENT DOCUMENTS

| JP | 2002-158035 | * | 5/2002 | ............ H01M 10/40 |
| JP | 2002158035 | * | 5/2002 | ............ H01M 10/40 |

(Continued)

OTHER PUBLICATIONS

Machine translation of Japanese Patent Publication JP2002-158035, published May 31, 2002, cited in a non-final Office Action issued by the USPTO, dated May 5, 2017.

*Primary Examiner* — Nguyen Ha
(74) *Attorney, Agent, or Firm* — Law Office of Katsuhiro Arai (57) ABSTRACT

In an embodiment, an electric storage device 1 includes: an electric storage element 50 having a positive electrode and a negative electrode; a non-aqueous electrolytic solution constituted by a non-aqueous solvent primarily containing cyclic ester and cyclic carbonate ester, in which an electrolyte containing lithium salt is dissolved and to which a sulfonate ester derivative whose reduction potential is higher than that of the cyclic ester and cyclic carbonate ester is added; and an outer container 70 that stores the electric storage element 50 and non-aqueous electrolytic solution. The electric storage device can offer both good low-temperature characteristics and good high-temperature reliability.

12 Claims, 3 Drawing Sheets

(56) References Cited

U.S. PATENT DOCUMENTS

| | | | |
|---|---|---|---|
| 2011/0223471 A1* | 9/2011 | Sato | H01M 2/0413 429/172 |
| 2013/0130128 A1 | 5/2013 | Okamoto et al. | |
| 2013/0216911 A1* | 8/2013 | Hosoya | H01M 4/362 429/221 |
| 2013/0288112 A1* | 10/2013 | Ito | H01G 11/62 429/188 |
| 2015/0140443 A1* | 5/2015 | Takahashi | H01M 4/505 429/330 |

FOREIGN PATENT DOCUMENTS

| | | |
|---|---|---|
| JP | 2013062329 A | 4/2013 |
| WO | 2012017999 A1 | 2/2012 |

\* cited by examiner

ELECTRIC STORAGE DEVICE

BACKGROUND

Field of the Invention

The present invention relates to an electric storage device with built-in, chargeable/dischargeable electric storage element.

Description of the Related Art

Known electric storage devices include electric double-layer capacitors, redox capacitors, lithium ion capacitors, lithium ion batteries, etc. In particular, lithium ion capacitors are drawing attention for their high level of energy density and high number of repeatable charge/discharge cycles which are made possible by combining a positive electrode similar to that of an electric double-layer capacitor or redox capacitor, and a negative electrode using a carbon material capable of occluding lithium ions.

At the same time, recently lithium ion capacitors are required to maintain their capacitance in a low-temperature state, while ensuring reliability in a high-temperature state (such as 85° C.).

In the area of improving low-temperature characteristics, Patent Literature 1 below, for example, proposes a lithium ion capacitor offering improved low-temperature characteristics by forming a film on the surface of the negative electrode by means of adding vinylene carbonate, as an additive, to non-aqueous electrolytic solution containing γ-butyrolactone.

In the area of improving high-temperature reliability, on the other hand, Patent Literature 2 below, for example, proposes an electrolytic solution capable of improving the cycle characteristics, as well as characteristics after short-term (24 hours or so) high-temperature holding test, of a lithium ion battery by adding a methylene bis sulfonate derivative to an electrolytic solution that uses a mixed solvent of ethylene carbonate and ethyl methyl carbonate.

BACKGROUND ART LITERATURES

[Patent Literature 1] Japanese Patent Laid-open No. 2013-62329

[Patent Literature 2] International Patent Laid-open No. WO2012/017999

SUMMARY

However, the reductive decomposition of γ-butyrolactone cannot be suppressed in a high-temperature state even when the lithium ion capacitor proposed by Patent Literature 1 is used, which leaves problems regarding reliability at high temperature, such as the film formed on the surface of the negative electrode inhibiting the migration of lithium ions, or the internal pressure of the cell rising due to generation of gas during reductive decomposition.

In addition, use of the electrolytic solution proposed by Patent Literature 2 still presents problems associated with the keeping of the device at high temperature for a long period of time, such as further formation of film on the surface of the negative electrode or decomposition of the electrolytic solution.

An object of the present invention, which was developed in light of the aforementioned problems, is to provide an electric storage device offering both good low-temperature characteristics and good high-temperature reliability.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, an electric storage device pertaining to an embodiment of the present invention comprises: an electric storage element having a positive electrode and a negative electrode; a non-aqueous electrolytic solution that contains a non-aqueous solvent primarily containing cyclic ester and cyclic carbonate ester, an electrolyte containing lithium salt, and a sulfonate ester derivative whose reduction potential is higher than the that of the cyclic ester and cyclic carbonate ester; and an outer container (or outer can) that stores the electric storage element and non-aqueous electrolytic solution.

In the aforementioned constitution, the cyclic ester can be γ-butyrolactone (GBL).

In the aforementioned constitution, the cyclic carbonate ester can be ethylene carbonate (EC), or propylene carbonate (PC), or both.

In the aforementioned constitution, the volume ratio of the cyclic ester to the cyclic carbonate ester in the non-aqueous solvent can be adjusted to 1/9 or higher but 7/3 or lower.

In the aforementioned constitution, the volume ratio of the cyclic ester to the cyclic carbonate ester in the non-aqueous solvent can be adjusted to 2/8 or higher but 7/3 or lower.

In the aforementioned constitution, the amount of the sulfonate ester derivative added can be adjusted to 0.1 percent by weight or more but 5 percent by weight or less relative to the electrolytic solution constituted by the cyclic ester, cyclic carbonate ester and electrolyte.

In the aforementioned constitution, the amount of the sulfonate ester derivative added can be adjusted to 1 percent by weight or more but 5 percent by weight or less relative to the electrolytic solution constituted by the cyclic ester, cyclic carbonate ester and electrolyte.

In the aforementioned constitution, the electric storage device can be a lithium ion capacitor.

According to the present invention, an electric storage device offering both good low-temperature characteristics and good high-temperature reliability can be provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

10 Positive electrode
11 (Positive electrode) Current collector
12 (Positive electrode) Electrode layer
20 Negative electrode
21 (Negative electrode) Current collector
22 (Negative electrode) Electrode layer
30l Separator
41 Positive electrode terminal
42 Negative electrode terminal
50 Electric storage element
60 Sealing rubber
70 Outer container

DETAILED DESCRIPTION OF EMBODIMENTS

Figure 1:
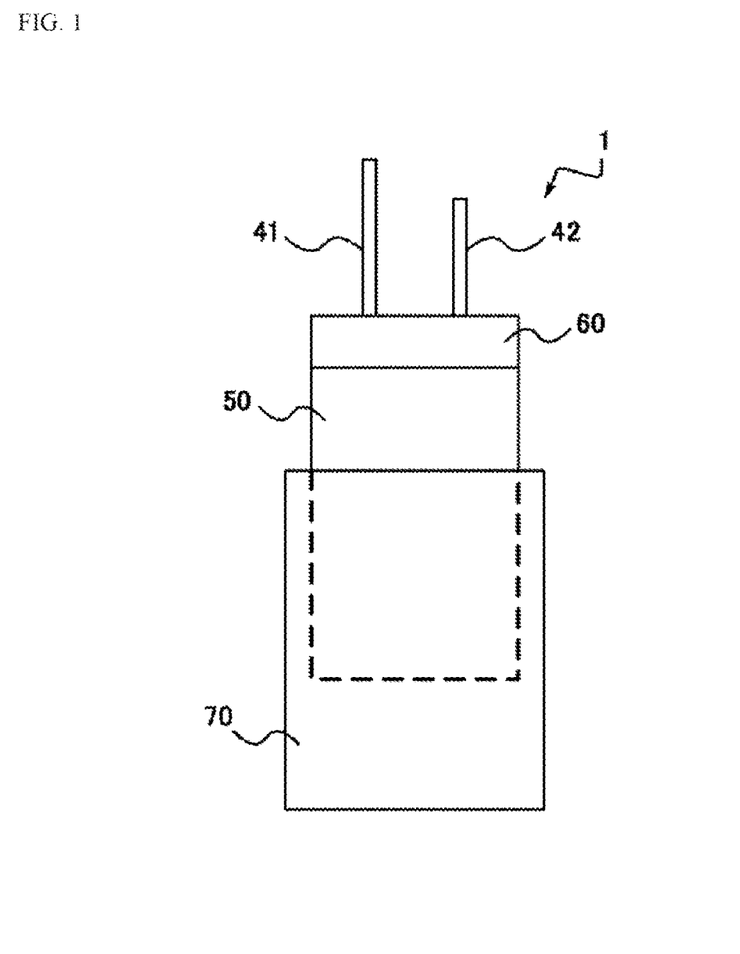
FIG. 1 is an exploded view of an electric storage device in an embodiment of the present invention.

A mode of embodying the present invention as a lithium ion capacitor is explained below based on the drawings. FIG. 1 is an exploded view of an electric storage device, or more specifically a lithium ion capacitor 1, in this embodiment, FIG. 2 is a perspective view developing a part of the element of the electric storage device in FIG. 1, and FIG. 3 is a view of section A-A' of FIG. 2.

Figure 2:
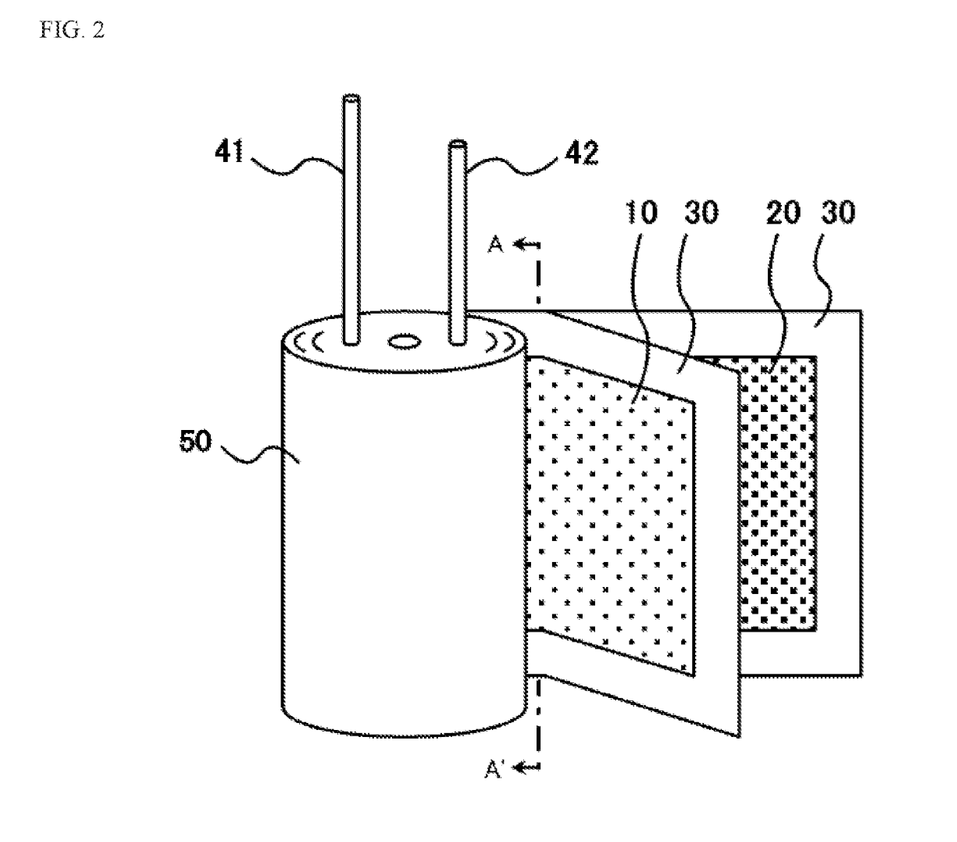
FIG. 2 is a perspective view developing a part of the element of the electric storage device in FIG. 1.
Figure 3:
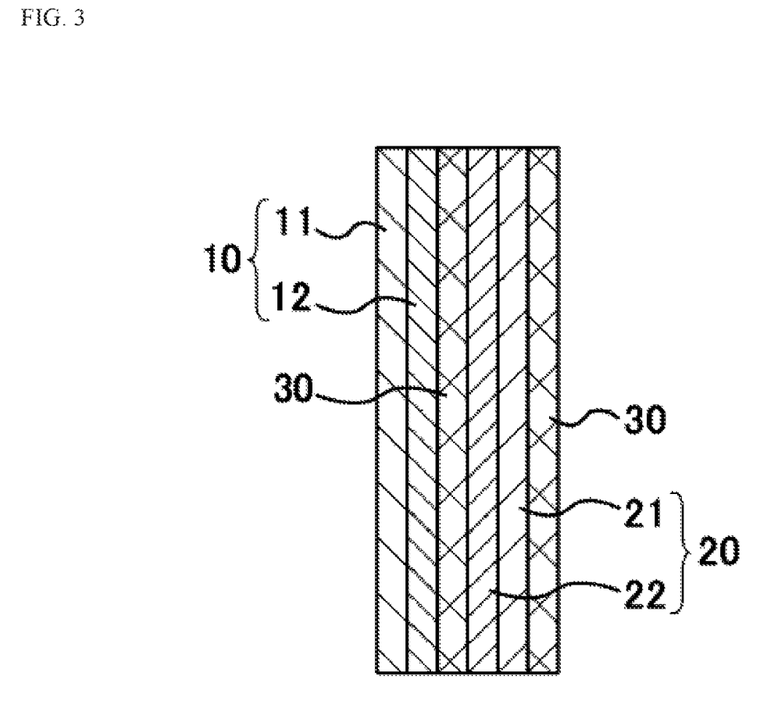
FIG. 3 is a view of section A-A' of FIG. 2.

As shown in FIG. 1 through FIG. 3, the lithium ion capacitor 1 in this embodiment has an electric storage element 50 provided inside an outer container 70, wherein the element has a positive electrode 10, negative electrode 20, and separator 30, with a pair of terminals 41, 42 connected to the positive electrode 10 and negative electrode 20, respectively, and extended and connected to the exterior of the outer container 70 via a sealing rubber 60. Also, a non-aqueous electrolytic solution is sealed inside the outer container 70 and contacting electrode layers 12, 22 as a result of being impregnated into the electrode layers 12, 22 of the positive electrode 10 and negative electrode 20 or into the separator 30. Furthermore, the sealing rubber 60 is clinched by the outer container 70 to keep the lithium ion capacitor sealed.

[Positive Electrode]

The positive electrode 10 is structured in such a way that an electrode layer 12 is formed on the surface of a current collector 11, for example. For the current collector 11, aluminum foil can be used, for example, and the foil can be perforated, as well. For the electrode layer 12, any known material/structure used for the electrode layers of electric double-layer capacitors and redox capacitors is acceptable; for example, it can contain polyacene (PAS), polyaniline (PAN), active carbon, carbon black, graphite, carbon nanotubes, etc., and, if necessary, any conductive additive, binder or other component used in the electrode layers of electric double-layer capacitors, etc.

[Negative Electrode]

The negative electrode 20 is structured in such a way that an electrode layer 22 is formed on the surface of a current collector 21, for example. For the current collector 21, copper metal foil can be used, for example, and the foil can be perforated, as well. The electrode layer 22 can contain non-graphitizable carbon, graphite, tin oxide, silicon oxide or other active material, and, if necessary, any conductive additive such as carbon black or metal powder, and binder such as poly-tetrafluoro ethylene (PTFE), polyvinylidene fluoride (PVDF) or styrene butadiene rubber (SBR).

[Separator]

The separator 30 is provided between the positive electrode and negative electrode, for example, to prevent short-circuiting caused by contact between these two electrodes and also to hold electrolytic solution inside its voids to form conductive paths connecting the electrodes. For the material of the separator 30, porous cellulose, polypropylene, polyethylene, fluororesin, etc., can be used, for example.

It should be noted that, while an electric storage element 50 of rolled structure is shown in FIGS. 1 and 2, the present invention is not limited to this and the positive electrode and negative electrode may each comprise a stack of multiple layers. Also, the shape of the outer container 70 is not limited to the cylinder as shown in FIG. 1, and it may be a roughly rectangular solid.

In the meantime, by allowing a lithium metal sheet to electrically connect to the negative electrode 20 when the electric storage element 50 and non-aqueous electrolytic solution are sealed in the outer container 70, the lithium in the lithium metal sheet will dissolve in the non-aqueous electrolytic solution and the resulting lithium ions will be pre-doped in the electrode layer 22 of the negative electrode 20. This way, the potential of the negative electrode 20 will become around 3 V lower than the potential of the positive electrode 10 in a state before charging.

[Non-Aqueous Electrolytic Solution]

The non-aqueous electrolytic solution is prepared by dissolving the electrolyte in the non-aqueous solvent as described below. Additives can also be mixed in.

(Non-Aqueous Solvent)

The non-aqueous solvent is substantially constituted by a mixed solvent of cyclic ester and cyclic carbonate ester. Specific examples of the cyclic ester include γ-butyrolactone (GBL), γ-valerolactone (GVL), and the like, where GBL is especially preferred for its low melting point and low viscosity. Specific examples of the cyclic carbonate ester include, but are not limited to, ethylene carbonate (EC), propylene carbonate (PC), butylene carbonate, and the like.

(Electrolyte)

The electrolyte may be lithium salt, such as $LiPF_6$, for example. The content of the electrolyte is 0.5 mol or more but 2 mol or less per 1 liter of the non-aqueous electrolytic solution.

(Additive)

As an additive, a sulfonate ester derivative whose reduction potential (or generally oxidation-reduction potential) is higher than the primary components (cyclic ester and cyclic carbonate ester) of the non-aqueous solvent (as measured under the same conditions) can be used. Specific examples include, but are not limited to, bis(ethane sulfonate) methylene, bis(2,4,6-trimethyl benzene sulfonate) methylene, and the like. Preferably the additive is added by 0.1 percent by weight or more but 5 percent by weight or less relative to the electrolytic solution comprising the electrolyte dissolved in the primary components of the non-aqueous solvent.

Any other additive may be mixed into the non-aqueous electrolytic solution of the present invention, as deemed appropriate, by a range of 0.1 percent by weight to 5 percent by weight.

[Outer Container]

For the material of the outer container, aluminum, stainless steel, iron, or other metal can be used. Also, its shape can be changed in a variety of ways, such as cylinder and rectangular solid, according to the intended use.

EXAMPLES AND COMPARATIVE EXAMPLES

Examples and comparative examples of lithium ion capacitors pertaining to the present invention are given below, and their test results are shown in Tables 1 to 3.

It should be noted that the reduction potential of the solvent and that of the additive were measured with the electrochemical measuring system HZ-5000 manufactured by Hokuto Denko Corporation by preparing, inside a glove box in argon ambience, a three-electrode beaker cell having a working electrode made of glassy carbon as well as a reference electrode and counter electrode made of Li metal, and then filling the three-electrode beaker cell with the electrolytic solution.

Example 1

For the positive electrode, a slurry was prepared using PAS as an active material as well as commercially available carboxy methyl cellulose and styrene butadiene rubber as binders, and the slurry was applied onto a perforated aluminum foil to obtain a sheet-shaped positive electrode. For the negative electrode, a slurry was prepared using non-graphitizable carbon made of phenolic resin material as an active material as well as carboxy methyl cellulose and styrene butadiene rubber as binders, and the slurry was applied onto a perforated copper foil to obtain a sheet-shaped negative electrode. A cellulose separator was sandwiched between these electrodes, leader terminals were attached to a current collector by means of ultrasonic welding, and the components were rolled and secured with polyimide adhesive tape. A sealing rubber was attached to the element thus prepared and the element was vacuum-dried at approx. 180° C., after which lithium foil was attached to the negative electrode and the element was housed in the outer container.

Furthermore, an electrolytic solution was obtained by preparing a mixed solvent of GBL (manufactured by Kishida Chemical Co., Ltd. (for LBG), reduction potential of approx. 0.8 V (vs Li/Li$^+$)) and EC (manufactured by Kishida Chemical Co., Ltd. (for LBG), reduction potential of approx. 0.7 V (vs Li/Li$^+$)) (at a volume ratio of GBL:EC=1:2), dissolving LiPF$_6$ in the mixed solvent, and then adding to this solution (1.2 mol/L) an additive constituted by bis(ethane sulfonate) methylene (manufactured by Wako Pure Chemical Industries, Ltd., product name WEA-18, reduction potential of approx. 1.2 V (vs Li/Li$^+$), denoted by "ADD-1" in Tables 1 to 3) by 0.1 percent by weight, after which the electrolytic solution was injected into the outer container and the sealing rubber part was clinched to prepare an electric storage device.

Examples 2 to 7

A lithium ion capacitor was prepared under the same method as in Example 1, except that the amount of additive was changed as shown in Table 1 over a range of 0.5 to 10 percent by weight.

Example 8

A lithium ion capacitor was prepared under the same method as in Example 1, except that the type of additive was changed from bis(ethane sulfonate) methylene to bis(2,4,6-trimethyl benzene sulfonate) methylene (manufactured by Wako Pure Chemical Industries, Ltd., product name WEA-36, reduction potential of approx. 1.2 V (vs Li/Li$^+$), denoted by "ADD-2" in Table 1).

Examples 9 to 14

A lithium ion capacitor was prepared under the same method as in Example 8, except that the amount of additive was changed as shown in Table 1 over a range of 0.5 to 10 percent by weight.

Comparative Example 1

A lithium ion capacitor was prepared under the same method as in Example 1, except that no additive was added.

[Evaluation Method]

After the lithium ion capacitors in Examples 1 to 14 and Comparative Example 1 were prepared, their initial characteristics were measured in the form of capacitance and internal resistance at room temperature. Thereafter, they were left for 2 hours in a thermostatic chamber adjusted to −25° C. and then measured for capacitance, after which the ratio of the capacitance at −25° C. to the capacitance at room temperature was obtained as a percent value to calculate the ratio of maintenance of capacitance at low temperature. This value is denoted by "Ratio of Maintenance of Capacitance (−25° C.)" in Table 1.

Separately from the above, a float test was conducted that involved continuous charging for 1000 hours at a voltage of 3.8 V in a thermostatic chamber adjusted to 85° C. After the float test, the cell was let cool to room temperature and the capacitance and internal resistance were measured, after which their ratios to the initial characteristics were obtained as percent values to calculate the ratio of maintenance of capacitance and the ratio of change in internal resistance, respectively. These values are also shown in Table 1 as "Ratio of Maintenance of Capacitance" and "Ratio of Change in Internal Resistance" under "After Float Test."

[Evaluation Results]

(Low-Temperature Characteristics)

In all of Examples 1 to 14 and Comparative Example 1, the ratio of maintenance of capacitance at low temperature exceeded 50%, indicating that the low-temperature characteristics were good enough to withstand practical use. However, it is more preferable that the ratio of maintenance of capacitance is 60% or more, in which case the amount of 5% or less is a more preferable range for the additive, as is the case in Examples 1 to 5 and Examples 8 to 12.

(High-Temperature Reliability)

For the ratio of maintenance of capacitance and ratio of change in internal resistance after the float test, the results of Examples 1 to 14 were better than those of Comparative Example 1. In particular, the characteristics after the float test improved clearly when the amount of additive was 0.5 percent by weight or more, and the ratio of change in internal resistance improved further to less than 160% when the amount of additive was 1 percent by weight or more. When the amount of additive exceeded 5 percent by weight, however, significant improvement was no longer observed and instead there was an adverse effect in that the initial internal resistance rose.

TABLE 1

| | | Additive | | Initial characteristics | | Ratio of maintenance of capacitance (−25° C.) [%] | After float test | |
| | | | | | | | Ratio of maintenance of capacitance [%] | Ratio of change in internal resistance [%] |
| | Solvent | Type | Amount of additive [wt %] | Capacitance [F] | Internal resistance [mΩ] | | | |
|---|---|---|---|---|---|---|---|---|
| Example 1 | GBL:EC (1:2) | ADD-1 | 0.1 | 40 | 76 | 65 | 48 | 280 |
| Example 2 | GBL:EC (1:2) | ADD-1 | 0.5 | 41 | 78 | 65 | 72 | 174 |
| Example 3 | GBL:EC (1:2) | ADD-1 | 1 | 40 | 81 | 64 | 78 | 142 |
| Example 4 | GBL:EC (1:2) | ADD-1 | 3 | 40 | 88 | 64 | 81 | 132 |
| Example 5 | GBL:EC (1:2) | ADD-1 | 5 | 39 | 95 | 63 | 82 | 128 |
| Example 6 | GBL:EC (1:2) | ADD-1 | 8 | 37 | 104 | 59 | 83 | 126 |
| Example 7 | GBL:EC (1:2) | ADD-1 | 10 | 35 | 112 | 56 | 84 | 126 |
| Example 8 | GBL:EC (1:2) | ADD-2 | 0.1 | 41 | 76 | 65 | 48 | 280 |
| Example 9 | GBL:EC (1:2) | ADD-2 | 0.5 | 40 | 78 | 65 | 70 | 180 |
| Example 10 | GBL:EC (1:2) | ADD-2 | 1 | 40 | 83 | 65 | 76 | 152 |
| Example 11 | GBL:EC (1:2) | ADD-2 | 3 | 39 | 90 | 63 | 78 | 138 |
| Example 12 | GBL:EC (1:2) | ADD-2 | 5 | 39 | 98 | 61 | 80 | 135 |
| Example 13 | GBL:EC (1:2) | ADD-2 | 8 | 37 | 109 | 57 | 81 | 132 |
| Example 14 | GBL:EC (1:2) | ADD-2 | 10 | 35 | 118 | 54 | 82 | 132 |
| Comparative Example 1 | GBL:EC (1:2) | — | — | 40 | 76 | 65 | 46 | 300 |

Examples 15 to 24

A lithium ion capacitor was prepared under the same method as in Example 3, except that the volume ratio of GBL and EC constituting the solvent was changed as shown in Table 2 over a range of 10:0 to 1:9.

Examples 25 to 27

A lithium ion capacitor was prepared under the same method as in Example 3, except that a mixed solvent of GBL, EC, and PC (manufactured by Kishida Chemical Co., Ltd. (for LBG), reduction potential of approx. 0.8 V (vs Li/Li$^+$)) was used and the volume ratio was changed as shown in Table 2.

Comparative Examples 2 and 3

A lithium ion capacitor was prepared under the same method as in Example 3, except that, for the solvent, EC was changed to dimethyl carbonate (DMC), which is a chained carbonate ester, and the ratio of GBL and DMC was changed as shown in Table 2.

Comparative Examples 4 and 5

A lithium ion capacitor was prepared under the same method as in Example 3, except that, for the solvent, EC was changed to ethyl methyl carbonate (EMC), which is a chained carbonate ester, and the ratio of GBL and EMC was changed as shown in Table 2.

Comparative Example 6

A lithium ion capacitor was prepared under the same method as in Example 3, except that a mixed solvent of EC and EMC was used and their volume ratio was changed to 5:5.

Comparative Example 7

A lithium ion capacitor was prepared under the same method as in Example 3, except that a mixed solvent of GBL, DMC, EC, and EMC was used and their volume ratio was changed to 1:10:10:10.

[Evaluation Method]

After the lithium ion capacitors in Examples 15 to 27 and Comparative Example 2 to 7 were prepared, they were measured and evaluated in the same manner as with Examples 1 to 14 and Comparative Example 1. The results are summarized in Table 2.

[Evaluation Results]

(Low-Ttemperature Characteristics)

In all of Examples 15 to 22, Examples 25 to 27, and Comparative Examples 2 to 7, the ratio of maintenance of capacitance at low temperature exceeded 50%, indicating that the low-temperature characteristics were good enough to withstand practical use. However, it is more preferable that the ratio of maintenance of capacitance is 60% or more, in which case the volume ratio of 10:0 to 3:7 is a more preferable range for γ-butyrolactone and cyclic carbonate ester (ethylene carbonate (EC) and propylene carbonate (PC)), as is the case in Examples 15 to 22 and Examples 25 and 26.

(High-Temperature Reliability)

For the ratio of maintenance of capacitance and ratio of change in internal resistance after the float test, mixing in the additive made no improvement when the mixing ratio of γ-butyrolactone or cyclic carbonate ester was extremely small. To be specific, adjusting the mixing ratio of γ-butyrolactone and cyclic carbonate ester to a range of 9:1 to 2:8 produced better effects, as in Examples 16 to 23 and Examples 25 to 27. This is probably because mixing in the additive did not form effective film for suppressing the reductive decomposition of γ-butyrolactone when the mixing ratio of cyclic carbonate ester was extremely small, while the thermal decomposition of LiPF$_6$ being the electrolyte progressed when the mixing ratio of γ-butyrolactone was extremely small.

On the other hand, comparing Examples 18 and 20 and Comparative Examples 2 to 5 found that the float reliability did not improve when chained carbonate ester was used instead of cyclic carbonate ester. This is probably because mixing in the additive did not form effective film for suppressing the reductive decomposition of γ-butyrolactone when chained carbonate ester was used instead of cyclic carbonate ester.

Also, in Comparative Example 6 where carbonate ester (ethylene carbonate (EC) and ethyl methyl carbonate (EMC)) alone were used as the primary components of the solvent and in Comparative Example 7 where a small amount of γ-butyrolactone was added, use of the additive did not improve the float reliability. This is probably because the thermal decomposition of $LiPF_6$ being the electrolyte progressed for the aforementioned reason.

Based on the above results, a more preferable range of the volume ratio of γ-butyrolactone and cyclic carbonate ester is 9:1 to 3:7 when both the low-temperature characteristics and high-temperature reliability are considered.

50%, indicating that the low-temperature characteristics were good enough to withstand practical use. However, it is more preferable that the ratio of maintenance of capacitance is 60% or more, in which case the volume ratio of 10:0 to 3:7 is a more preferable range for γ-butyrolactone and propylene carbonate, as is the case in Example 15 and Examples 28 to 34.

(High-Temperature Reliability)

In Example 15 and Examples 28 to 37, mixing in the additive did not improve the float reliability when the mixing ratio of γ-butyrolactone or propylene carbonate was extremely small. To be specific, adjusting the mixing ratio of

TABLE 2

| | | Additive | | Initial characteristics | | Ratio of maintenance of capacitance (−25° C.) [%] | After float test | |
|---|---|---|---|---|---|---|---|---|
| | Solvent | Type | Amount of additive [wt %] | Capacitance [F] | Internal resistance [mΩ] | | Ratio of maintenance of capacitance [%] | Ratio of change in internal resistance [%] |
| Example 15 | GBL:EC (10:0) | ADD-1 | 1 | 41 | 83 | 81 | 52 | 260 |
| Example 16 | GBL:EC (9:1) | ADD-1 | 1 | 40 | 79 | 79 | 75 | 156 |
| Example 17 | GBL:EC (8:2) | ADD-1 | 1 | 40 | 77 | 77 | 78 | 134 |
| Example 18 | GBL:EC (7:3) | ADD-1 | 1 | 41 | 76 | 75 | 80 | 130 |
| Example 19 | GBL:EC (8:4) | ADD-1 | 1 | 40 | 74 | 73 | 81 | 132 |
| Example 20 | GBL:EC (5:5) | ADD-1 | 1 | 40 | 75 | 71 | 81 | 130 |
| Example 21 | GBL:EC (4:6) | ADD-1 | 1 | 40 | 78 | 68 | 79 | 142 |
| Example 22 | GBL:EC (3:7) | ADD-1 | 1 | 40 | 83 | 64 | 76 | 150 |
| Example 23 | GBL:EC (2:8) | ADD-1 | 1 | 40 | 90 | 32 | 72 | 162 |
| Example 24 | GBL:EC (1:9) | ADD-1 | 1 | 40 | 96 | 97 | 66 | 178 |
| Example 25 | GBL:EC:PC (8:1:1) | ADD-1 | 1 | 41 | 78 | 77 | 80 | 132 |
| Example 26 | GBL:EC:PC (5:2.5:2.5) | ADD-1 | 1 | 40 | 73 | 72 | 82 | 130 |
| Example 27 | GBL:EC:PC (2:4:4) | ADD-1 | 1 | 40 | 91 | 59 | 72 | 160 |
| Comparative Example 2 | GBL:DMC (7:3) | ADD-1 | 1 | 40 | 66 | 76 | 56 | 250 |
| Comparative Example 3 | GBL:DMC (5:5) | ADD-1 | 1 | 40 | 62 | 72 | 58 | 240 |
| Comparative Example 4 | GBL:EMC (7:3) | ADD-1 | 1 | 40 | 68 | 74 | 58 | 250 |
| Comparative Example 5 | GBL:EMC (5:5) | ADD-1 | 1 | 40 | 65 | 70 | 56 | 240 |
| Comparative Example 6 | EC:EMC (5:5) | ADD-1 | 1 | 40 | 70 | 68 | 48 | 210 |
| Comparative Example 7 | GBL:DMC:EC:EMC (1:10:10:10) | ADD-1 | 1 | 41 | 68 | 76 | 50 | 230 |

Examples 28 to 37

A lithium ion capacitor was prepared in the same manner as in Example 3, except that the volume ratio of GBL and PC constituting the solvent was changed as shown in Table 3 over a range of 10:0 to 0:10.

[Evaluation Method]

After the lithium ion capacitors in Examples 28 to 37 were prepared, they were measured and evaluated in the same manner as with Examples 1 to 14 and Comparative Example 1. The results are summarized in Table 3.

[Evaluation Results]

(Low-Temperature Characteristics)

In all of Example 15 and Examples 28 to 37, the ratio of maintenance of capacitance at low temperature exceeded γ-butyrolactone and propylene carbonate to a range of 9:1 to 2:8 produced better effects, as in Examples 28 to 35. These results are consistent with those considered in Table 2.

Furthermore, adjusting the volume ratio of γ-butyrolactone and cyclic carbonate ester to a range of 8:2 to 3:7 achieved an internal resistance ratio of 150% or less.

Based on the above results, when both the low-temperature characteristics and high-temperature reliability are considered, a more preferable range of the volume ratio of γ-butyrolactone and propylene carbonate is 9:1 to 3:7.

Furthermore, when the ratio of change in internal resistance is given particular emphasis, a more preferable range of the volume ratio of γ-butyrolactone and cyclic carbonate ester is 8:2 to 3:7.

TABLE 3

| | Solvent | Additive Type | Amount of additive [wt %] | Initial characteristics Capacitance [F] | Internal resistance [mΩ] | Ratio of maintenance of capacitance (−25° C.) [%] | After float test Ratio of maintenance of capacitance [%] | Ratio of change in internal resistance [%] |
|---|---|---|---|---|---|---|---|---|
| Example 15 | GBL:PC (10:0) | ADD-1 | 1 | 41 | 83 | 81 | 52 | 260 |
| Example 28 | GBL:PC (9:1) | ADD-1 | 1 | 40 | 80 | 79 | 74 | 158 |
| Example 29 | GBL:PC (8:2) | ADD-1 | 1 | 40 | 78 | 76 | 77 | 130 |
| Example 30 | GBL:PC (7:3) | ADD-1 | 1 | 40 | 77 | 74 | 80 | 128 |
| Example 31 | GBL:PC (6:4) | ADD-1 | 1 | 41 | 75 | 71 | 81 | 126 |
| Example 32 | GBL:PC (5:5) | ADD-1 | 1 | 40 | 78 | 68 | 79 | 128 |
| Example 33 | GBL:PC (4:6) | ADD-1 | 1 | 40 | 82 | 65 | 78 | 136 |
| Example 34 | GBL:PC (3:7) | ADD-1 | 1 | 40 | 86 | 62 | 76 | 148 |
| Example 35 | GBL:PC (2:8) | ADD-1 | 1 | 40 | 91 | 59 | 73 | 158 |
| Example 36 | GBL:PC (1:9) | ADD-1 | 1 | 40 | 94 | 57 | 65 | 186 |
| Example 37 | GBL:PC (0:10) | ADD-1 | 1 | 40 | 99 | 54 | 58 | 210 |

The foregoing described the examples of the present invention in detail, but the present invention is not limited to such specific examples in any way and various changes can be made so long as they do not deviate from the key points of the present invention as described in the claims.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2015-045403, filed Mar. 9, 2015, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electric storage device comprising:
an electric storage element having a positive electrode and a negative electrode;
a non-aqueous electrolytic solution that contains a non-aqueous solvent primarily constituted by a non-carbonate cyclic ester and a cyclic carbonate ester, an electrolyte containing lithium salt, and a sulfonate ester derivative whose reduction potential is higher than that of the non-carbonate cyclic ester and that of the cyclic carbonate ester; and
an outer container that stores the electric storage element and non-aqueous electrolytic solution,
wherein a volume ratio of the non-carbonate cyclic ester to the cyclic carbonate ester in the non-aqueous solvent is 1/9 or more but 7/3 or less.

2. An electric storage device according to claim 1, wherein the non-carbonate cyclic ester is γ-butyrolactone (GBL).

3. An electric storage device according to claim 2, wherein the cyclic carbonate ester is ethylene carbonate (EC), or propylene carbonate (PC), or both.

4. An electric storage device according to claim 3, wherein the sulfonate ester derivative is bis (ethane sulfonate) methylene or bis (2,4,6-trimethyl benzene sulfonate) methylene.

5. An electric storage device according to claim 2, wherein the sulfonate ester derivative is bis (ethane sulfonate) methylene or bis (2,4,6-trimethyl benzene sulfonate) methylene.

6. An electric storage device according to claim 1, wherein the cyclic carbonate ester is ethylene carbonate (EC), or propylene carbonate (PC), or both.

7. An electric storage device according to claim 6, wherein the sulfonate ester derivative is bis (ethane sulfonate) methylene or bis (2,4,6-trimethyl benzene sulfonate) methylene.

8. An electric storage device according to claim 1, wherein the sulfonate ester derivative is bis (ethane sulfonate) methylene or bis (2,4,6-trimethyl benzene sulfonate) methylene.

9. An electric storage device according to claim 1, wherein a volume ratio of the non-carbonate cyclic ester to the cyclic carbonate ester in the non-aqueous solvent is 2/8 or more but 7/3 or less.

10. An electric storage device according to claim 1, wherein an amount of the sulfonate ester derivative added is 0.1 percent by weight or more but 5 percent by weight or less relative to the electrolytic solution constituted by the non-carbonate cyclic ester, cyclic carbonate ester and electrolyte.

11. An electric storage device according to claim 1, wherein an amount of the sulfonate ester derivative added is 1 percent by weight or more but 5 percent by weight or less relative to the electrolytic solution constituted by the non-carbonate cyclic ester, cyclic carbonate ester, and electrolyte.

12. An electric storage device according to claim 1, wherein the electric storage device is a lithium ion capacitor.

* * * * *